United States Patent
Larrieu et al.

(10) Patent No.: US 11,586,027 B2
(45) Date of Patent: Feb. 21, 2023

(54) METHOD FOR IMAGING A SAMPLE BY MEANS OF A LIGHT-SHEET MICROSCOPE

(71) Applicant: LEICA MICROSYSTEMS CMS GMBH, Wetzlar (DE)

(72) Inventors: Theo Larrieu, Paris (FR); Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 204 days.

(21) Appl. No.: 16/964,209

(22) PCT Filed: Jan. 29, 2019

(86) PCT No.: PCT/EP2019/052036
§ 371 (c)(1),
(2) Date: Jul. 23, 2020

(87) PCT Pub. No.: WO2019/149666
PCT Pub. Date: Aug. 8, 2019

(65) Prior Publication Data
US 2021/0041681 A1   Feb. 11, 2021

(30) Foreign Application Priority Data
Feb. 1, 2018   (DE) ..................... 10 2018 102 241.7

(51) Int. Cl.
*G02B 21/00* (2006.01)
*G02B 21/06* (2006.01)

(52) U.S. Cl.
CPC ......... *G02B 21/06* (2013.01); *G02B 21/0068* (2013.01); *G02B 21/0076* (2013.01)

(58) Field of Classification Search
CPC .............. G02B 21/002; G02B 21/0032; G02B 21/0068; G02B 21/0076; G02B 21/06;
(Continued)

(56) References Cited

U.S. PATENT DOCUMENTS 10,379,335 B2 *   8/2019   Iguchi ................ G02B 21/0076
2006/0033987 A1   2/2006   Stelzer et al.
(Continued)

FOREIGN PATENT DOCUMENTS

DE   102007045897 A1   4/2009
DE   102012214568 A1   2/2014
(Continued)

OTHER PUBLICATIONS

Ball, Graeme et al. "SIMcheck: a Toolbox for Successful Super-resolution Structured Illumination Microscopy," Scientific Reports, vol. 5, No. 1, Nov. 3, 2015, XP055587669.
(Continued)

*Primary Examiner* — Mustak Choudhury
(74) *Attorney, Agent, or Firm* — Leydig, Voit & Mayer, Ltd.

(57) ABSTRACT

A method for imaging a sample using a light-sheet microscope includes illuminating the sample from two different illumination directions using two light sheets, which have different polarization states and are superimposed on one another in a coplanar manner in a target region of the sample. An image of the illuminated target region is generated using an imaging optical unit of the light-sheet microscope. An interference pattern is generated using the two light sheets in the illuminated target region, whereby an image modulation corresponding to the interference pattern is applied to the image of the target region. The image modulation is evaluated. The illuminated target region is aligned in dependence on the evaluated image modulation in relation to a focal region of the imaging optical unit.

16 Claims, 9 Drawing Sheets

(58) Field of Classification Search
CPC .... G02B 21/16; G02B 21/365; G02B 21/367; G06V 10/60; G06V 10/141; G06V 10/751
See application file for complete search history.

(56) References Cited

U.S. PATENT DOCUMENTS

| | | |
|---|---|---|
| 2010/0201784 A1 | 8/2010 | Lippert et al. |
| 2014/0139840 A1 | 5/2014 | Judkewitz et al. |
| 2015/0205087 A1 | 7/2015 | Schumann |
| 2018/0172578 A1* | 6/2018 | Fiolka .................... G02B 27/10 |
| 2019/0025563 A1 | 1/2019 | Fahrbach et al. |
| 2019/0146202 A1 | 5/2019 | Schumann |

FOREIGN PATENT DOCUMENTS

| | | |
|---|---|---|
| DE | 102014116174 A1 | 5/2016 |
| DE | 102016108384 B3 | 11/2017 |
| WO | WO 2004/053558 A1 | 6/2004 |
| WO | WO 2014/026683 A1 | 2/2014 |
| WO | WO 2017/060506 A1 | 4/2017 |

OTHER PUBLICATIONS

Weber, Michael et al. "Chapter 11—Light sheet mictroscopy," Jan. 1, 2014, Qualtitative Imaging in Cell Biology; Methods in Cell Biology; ISSN 0091-679X, vol. 123, Elsevier, US, pp. 193-215, XP008175309.

Chang, Bo-Jui et al. "csiLSFM combines light-sheet fluorescence microscopy and coherent structured illumination for a lateral resolution below 100 nm," PNAS, 114(19)4869-4874, May 9, 2017.

* cited by examiner

METHOD FOR IMAGING A SAMPLE BY MEANS OF A LIGHT-SHEET MICROSCOPE

CROSS-REFERENCE TO PRIOR APPLICATIONS

This application is a U.S. National Phase Application under 35 U.S.C. § 371 of International Application No. PCT/EP2019/052036, filed on Jan. 29, 2019, and claims benefit to German Patent Application No. DE 10 2018 102 241.7, filed on Feb. 1, 2018. The International Application was published in German on Aug. 8, 2019 as WO 2019/149666 A1 under PCT Article 21(2).

FIELD

The invention relates to a method for imaging a sample by means of a light-sheet microscope, in which the sample is illuminated from two different illumination directions using two light sheets, which have different polarization states and are superimposed on one another in a coplanar manner in a target region of the sample, and an image of the illuminated target region is generated by means of an imaging optical unit of the light-sheet microscope. Furthermore, the invention relates to a correspondingly working light-sheet microscope.

BACKGROUND

In so-called light-sheet or light-plate microscopy, a target region of a sample is illuminated using a thin light sheet via an illumination optical unit and the target region thus illuminated is imaged by means of an imaging optical unit, the optical axis of which is perpendicular to the optical axis of the illumination optical unit. Three-dimensional imaging is possible by displacing the target region, which ideally coincides with the focal region of the imaging optical unit and is illuminated by the light sheet, successively along the optical axis of the imaging optical unit through the sample. One advantage of this method used in wide-field fluorescence microscopy is also in particular a particularly low light stress of the sample.

However, it is problematic that the illumination light propagates perpendicularly to the optical axis of the imaging optical unit. Scattering or absorption of the illumination light can thus occur due to scattering centers or absorbers, respectively, within the sample, which is noticeable in the resulting image in the form of strip artifacts in the propagation direction of the illumination light.

To reduce such artifacts, it is proposed in the patent DE 10 2016 108 384 B3 that the target region of the sample be illuminated not only using one, but rather using two light sheets which are oriented from the same side, but from different illumination directions on the target region and are superimposed there on one another in a coplanar manner, i.e., in a common illumination plane. This type of light-sheet illumination is achieved in that an illumination light beam passes through a Wollaston prism, which splits the illumination light beam into two different linearly polarized partial beams, which are deflected away from the optical axis of the illumination beam path and thus enter the illumination plane, i.e., the target region of the sample, from different illumination directions. If shading of the illumination light occurs due to a scattering center or an absorber in one of the two illumination directions, sufficient light-sheet illumination of the target region is thus still ensured by the other illumination direction unimpaired by the scattering center or the absorber.

To ensure the sharpest possible imaging in a light-sheet microscope, a precise spatial overlap is required between the illumination plane, i.e., the target region defined by the light sheet thickness, which defines the sample volume excited to emit fluorescent radiation, and the focal plane, i.e., the focal region of the imaging optical unit defined by the depth of field. In the prior art, the fine setting required for this purpose, which is referred to hereinafter as overlap alignment, using which the spatial superposition between the illuminated target region and the focus region of the imaging optical unit is established, usually takes place in the context of a visual judgment, for example, using a reference preparation which does not have fluorescent particles. The microscopically recorded sample image itself can also be visually judged to perform the overlap alignment. However, such a procedure only enables a comparatively rough overlap alignment. In particular, the introduction of a reference preparation does not reflect the actual imaging situation in which, for example, sample-related aberrations occur due to an index of refraction mismatch. A comparatively complex alignment procedure, in contrast, provides introducing a mirror into the illumination beam path, which deflects the light sheet onto a reference position of the detector arranged in the image plane of the imaging beam path as soon as the alignment has occurred.

SUMMARY

In an embodiment, the present invention provides a method for imaging a sample using a light-sheet microscope. The sample is illuminated from two different illumination directions using two light sheets, which have different polarization states and are superimposed on one another in a coplanar manner in a target region of the sample. An image of the illuminated target region is generated using an imaging optical unit of the light-sheet microscope. An interference pattern is generated using the two light sheets in the illuminated target region, whereby an image modulation corresponding to the interference pattern is applied to the image of the target region. The image modulation is evaluated. The illuminated target region is aligned in dependence on the evaluated image modulation in relation to a focal region of the imaging optical unit.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
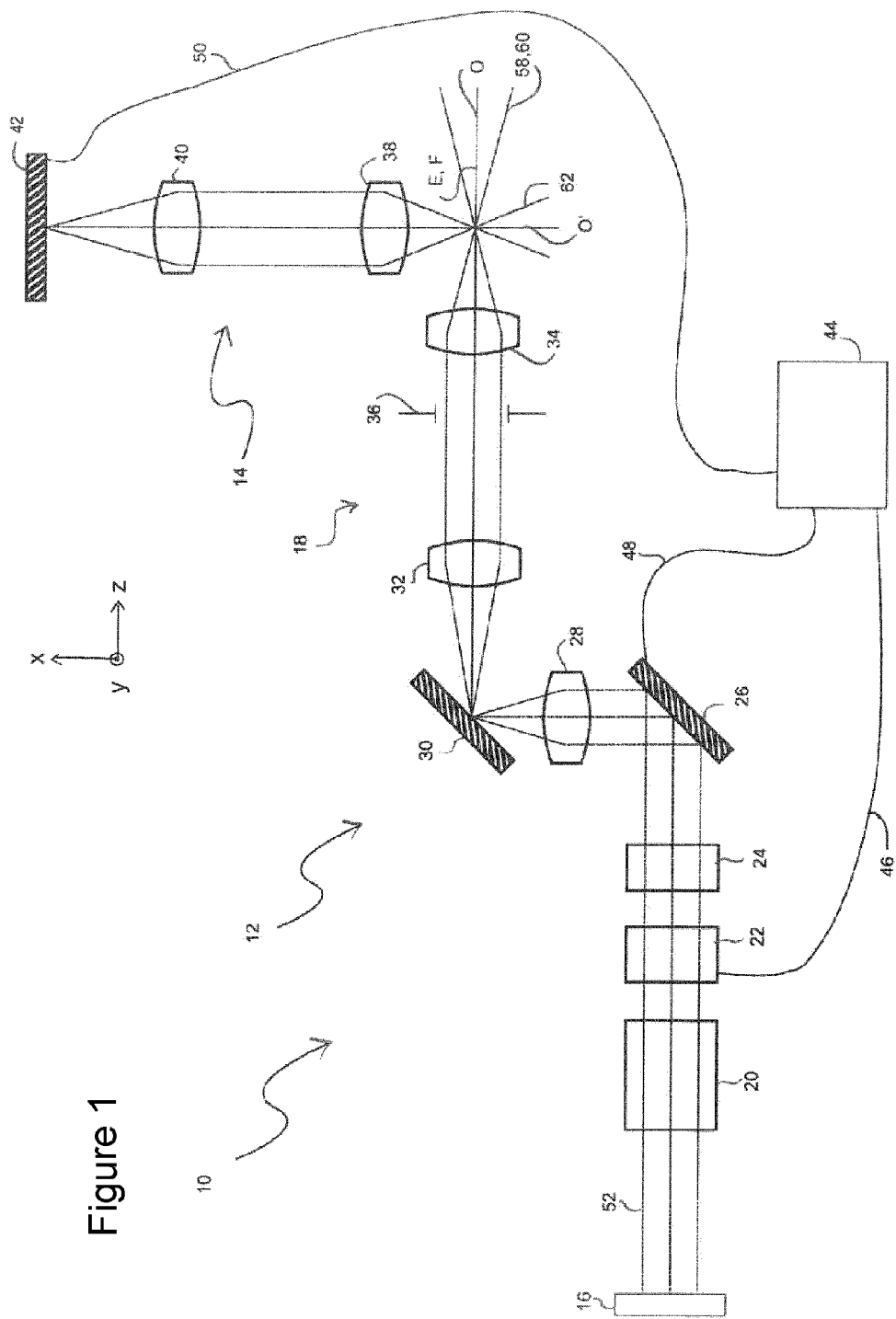
FIG. 1 shows an exemplary embodiment of a light-sheet microscope according to the invention in a schematic sectional view.

All of the above-mentioned prior methods share the feature that they do not enable automated overlap alignment. It is to be taken into consideration here that an alignment on the basis of an automated evaluation of the sharpness of the sample image is linked to the difficulty that the local spectrum of the sample to be imaged, which results from the Fourier transform of the sample image, is generally unknown. This means in particular that there is no a priori knowledge as to whether the local spectrum of the sample has high local frequencies at all which originate from fine and thus alignment-suitable sample structures.

Embodiments of the invention provide a method for imaging a sample by means of a light-sheet microscope and also a light-sheet microscope itself, which enable precise and automated alignment of the spatial superposition between the illuminated target region of the sample and the focal region of the imaging optical unit.

An embodiment of the invention provides a method for imaging a sample by means of a light-sheet microscope, in which the sample is illuminated from two different illumination directions using two light sheets, which have different polarization states and are superimposed on one another in a coplanar manner in a target region of the sample, and an image of the illuminated target region is generated by means of an imaging optical unit of the light-sheet microscope. An interference pattern is generated using the two light sheets in the illuminated target region, whereby an image modulation corresponding to the interference pattern is applied to the image of the target region. The image modulation is evaluated, and the illuminated target region is aligned in relation to the focal region of the imaging optical unit in dependence on the evaluated image modulation.

An embodiment of the invention provides an automated alignment of the illuminated target region in relation to the focal region of the imaging optical unit in that the image of the target region recorded by the imaging optical unit is evaluated with respect to an image modulation. The latter is applied to the image in that the imaged target region is illuminated using two interfering light sheets. In this way, an interference pattern illuminating the target region is generated, which is reflected in the image of the illuminated target region in the form of the above-mentioned image modulation, which is evaluated, for example, by a control unit provided for this purpose in the light-sheet microscope and is used for the automatic overlap alignment. The alignment is completed, for example, when the image modulation applied to the image of the illuminated target region is maximum. The modulation present in the image is thus strongly dependent on how precisely the target region to which the light sheet illumination is applied and the focal region of the imaging optical unit are spatially superimposed on one another. Stated in simple terms, the image modulation is then maximum when the illumination plane jointly defined by the two light sheets coincides with the focal plane of the imaging optical unit.

For the purposes of the overlap alignment, it is to be ensured that the two light sheets interfere with one another in the illuminated target region. The light sheets are thus to be generated such that they have a chronological and spatial coherence with respect to one another sufficient for an interference. In addition, it is to be ensured in particular that the two light sheets have polarization states during the alignment which enable interference of the light sheets in the target region at all. If one presumes, for example, that the two light sheets are differently linearly polarized from the outset, the light sheets thus interfere with one another in the target region if the polarization directions thereof are non-orthogonal with respect to one another. If this is ensured, a polarization means is not required, which is separately provided for the purpose of ensuring, by influencing the polarization states of the two light sheets, the ability thereof to interfere in the target region. Such a polarization means separately provided for producing the interference capability of the light sheets can advantageously be used, however, to generate a particularly pronounced interference pattern by corresponding influencing of the polarization states in the target region. For example, the polarization means can be used to linearly polarize the two light sheets in parallel, whereby the interference of the two light sheets is maximized.

Such a polarization means can be implemented, for example, by a birefringent crystal introduced at a suitable point in the illumination beam path or a polarizer of another type, for example, a retarder plate. The influencing of the polarization states of the light sheets can also be effectuated by polarization-dependent properties of the illumination optical unit, for example, by using polarization-dependent phases of interference layers or means for stress birefringence. Furthermore, electro-optical means or means operating based on liquid crystals are usable.

The image modulation is preferably evaluated by determining its amplitude. The illuminated target region is then aligned in relation to the focal region of the imaging optical unit in such a way that the amplitude of the image modulation is maximized. The amplitude of the image modulation thus represents an optimization parameter detectable in a simple manner, on the basis of which an automatic overlap alignment can be performed in the light-sheet microscope.

In one advantageous embodiment, a characteristic of the interference pattern is predetermined and the image modulation is evaluated on the basis of this predetermined characteristic. The above-mentioned characteristic is a property of the interference pattern, which may be derived, for example, from the selected geometry of the light sheet illumination and is thus known a priori. This known property of the interference pattern can then be used in a simple manner to evaluate the image modulation.

For example, the interference pattern is generated in the form of a strip pattern, the interference strips of which extend in parallel to a bisector of an angle, which the illumination directions of the two light sheets enclose with one another, wherein the strip pattern is characterized by a modulation period according to the following equation:

$$f = \lambda \sin(\alpha/2)$$

Therein, f denotes the modulation period, $\lambda$ denotes the wavelength of the light sheets, and a denotes the above-mentioned angle which the illumination directions enclose with one another.

In this example, the modulation period f represents a characteristic of the interference pattern known beforehand, which results from the predetermined wavelength $\lambda$ of the light sheets and the also predetermined angle $\alpha$ between the two illumination directions of the two light sheets according to the above equation. In addition to the modulation period, the alignment of the interference pattern is also known from the geometry of the light sheet illumination, i.e., the illumination directions of the two light sheets. On the basis of the knowledge of the modulation period and the alignment of the interference pattern, the amplitude of the image modulation may now be determined easily and reliably, for example, in the course of a Fourier analysis of the image. In the frequency space generated by the Fourier analysis, the narrowly localized modulation period of the interference strip is convoluted with the local spectrum of the sample, which represents the a priori unknown structure of the sample. However, since the recorded image of the target region is represented by positive real data, the total of these data, which makes up the steady component of the Fourier spectrum, is also always positive and real, so that the a priori knowledge of the modulation period f of the interference pattern and its alignment permits the amplitude of the image modulation to be reliably determined even with a high-frequency local spectrum of the sample.

In the above-mentioned example, the interference strips of the interference pattern, for angles $\alpha$ which are not excessively large between the illumination directions of the two light sheets, may thus be detected simply and reliably via the imaging optical unit of the light-sheet microscope in the form of a modulation of the recorded image. The amplitude of the image modulation applied to the image by the interference strips may thus be used as an optimization parameter or quality criterion for the coplanarity between the illumination plane and the focal plane of the imaging optical unit. Since the amplitude of the image modulation represents the only parameter to be optimized, the parameter space for setting the coplanarity is one-dimensional. Simple linear search algorithms may thus be applied to maximize the amplitude of the image modulation.

For the purposes of the overlap alignment, the two coplanar superimposed light sheets are preferably displaced jointly along the optical axis of the imaging optical unit. This can be carried out, for example, via a deflection element arranged in the illumination beam path, which is controlled in dependence on the evaluated image modulation. However, it is also possible to move the imaging optical unit instead of the light sheet illumination along its optical axis to bring the focal region into spatial coincidence with the illuminated target region. A simultaneous displacement of both the light sheets and also the focal region of the imaging optical unit is also possible.

In one preferred design, the two light sheets are transferred into interference-capable polarization states before the alignment of the illuminated target region in relation to the focal region of the imaging optical unit. For example, the above-mentioned polarization states are selected such that the two light sheets are polarized linearly, non-orthogonally, in particular in parallel to one another in the target region. It is thus ensured that a very pronounced interference pattern forms in the target region, by which a correspondingly strong image modulation is generated in the recorded image.

In a further advantageous embodiment, the two light sheets are brought into non-interference capable polarization states after the alignment of the illuminated target region in relation to the focal region of the imaging optical unit. A modulation of the microscope image which interferes with the actual imaging is thus avoided. This step may be automated on the basis of the Fourier analysis of the image.

A pre-alignment is preferably provided, in which the illuminated target region is adjusted as a function of the brightness of the image in relation to the focal region of the imaging optical unit. Such a pre-alignment can also be performed, in particular in the case of high-frequency local spectrum of the sample, in dependence on the energy content of the detected overall spectrum, which results from the convolution of the local spectrum and the illumination spectrum.

The light-sheet microscope according to an embodiment of the invention comprises an illumination unit, which is designed to illuminate a sample from two different illumination directions using two light sheets, which have different polarization states and are superimposed in a coplanar manner on one another in a target region of the sample, an imaging optical unit, which is designed to generate an image of the illuminated target region, and a control unit. The control unit is designed to control the illumination unit in such a way that an interference pattern is generated using the two light sheets in the illuminated target region, whereby an image modulation corresponding to the interference pattern is applied to the image of the target region. The control unit is furthermore designed to evaluate the image modulation and to control the illumination unit and/or the imaging optical unit in such a way that the illuminated target region is aligned in dependence on the evaluated image modulation in relation to the focal region of the imaging optical unit.

In one preferred design, the illumination unit comprises a light source which is designed to generate an illumination light beam, a first polarization element which is designed to split the illumination light beam into two differently polarized partial beams, and an illumination optical unit, which is designed to generate the two light sheets illuminating the target region from the two partial beams. The first polarization element is embodied, for example, such that it deflects the two partial beams at preferably opposing equal angles away from the optical axis of the illumination unit. If one denotes the angle which the two partial beams enclose with one another as ß (i.e., the opposing equal angles with respect to the optical axis where ±ß/2) and the magnification effectuated by the imaging optical unit by $\gamma$, in this embodiment, two light sheets are thus generated in the sample which propagate at an angle ±ß/2$\gamma$ with respect to the optical axis of the illumination unit within the sample. The angle ß>0, which the two propagation directions have with respect to one another reduces the imaging of strip artifacts caused by scattering and absorption.

The first polarization element is preferably designed such that the two partial beams are linearly polarized, wherein their polarization directions are orthogonal with respect to one another. These orthogonal polarization directions have the advantage in the actual imaging that image modulation due to interference between the two light sheets is precluded. Moreover, photoselection effects in the excitation of fluorophores are reduced by illumination using these two polarization directions.

In one preferred embodiment, the first polarization element is a Wollaston prism. Such a prism consists, for example, of two right-angle calcite prisms, which are cemented with one another on the base surfaces thereof. The optical axes of the two prisms are orthogonal to one another.

The illumination unit preferably comprises a deflection element controllable via the control unit, by which the two coplanar superimposed light sheets are jointly displaceable along the optical axis of the imaging optical unit. The deflection element is a mirror, for example, which is driven via a motor controlled by the control unit to move the two coplanar light sheets along the optical axis of the imaging optical unit.

In one particularly preferred embodiment, the illumination unit comprises a second polarization element controllable via the control unit, which is designed to transfer the two light sheets alternately into interference-capable polarization states and noninterference-capable polarization states. In particular in cooperation with the above-mentioned first polarization element, this embodiment enables both a precise overlap alignment and also high-resolution imaging which is in particular not disturbed by image modulations due to interference effects.

The light-sheet microscope according to an embodiment of the invention preferably has two separate objectives facing toward the sample, one of which is associated with the illumination unit and the other with the imaging optical unit and the optical axes of which are perpendicular to one another. The objective associated with the illumination unit preferably directs the two light sheets from the same side onto the target region of the sample.

The light-sheet microscope can also be embodied as a so-called oblique plane microscope, which has a single objective facing toward the sample for both the illumination and also the detection. The imaging optical unit of the light-sheet microscope is designed as a transport optical unit in this embodiment, which images the light sheets in the target region of the sample and simultaneously generates an image of the illuminated target region. The transport optical unit preferably has a scanning device which is designed to execute an axial and/or lateral grid process for volume imaging by moving the light sheets correspondingly through the sample.

Figure 2:
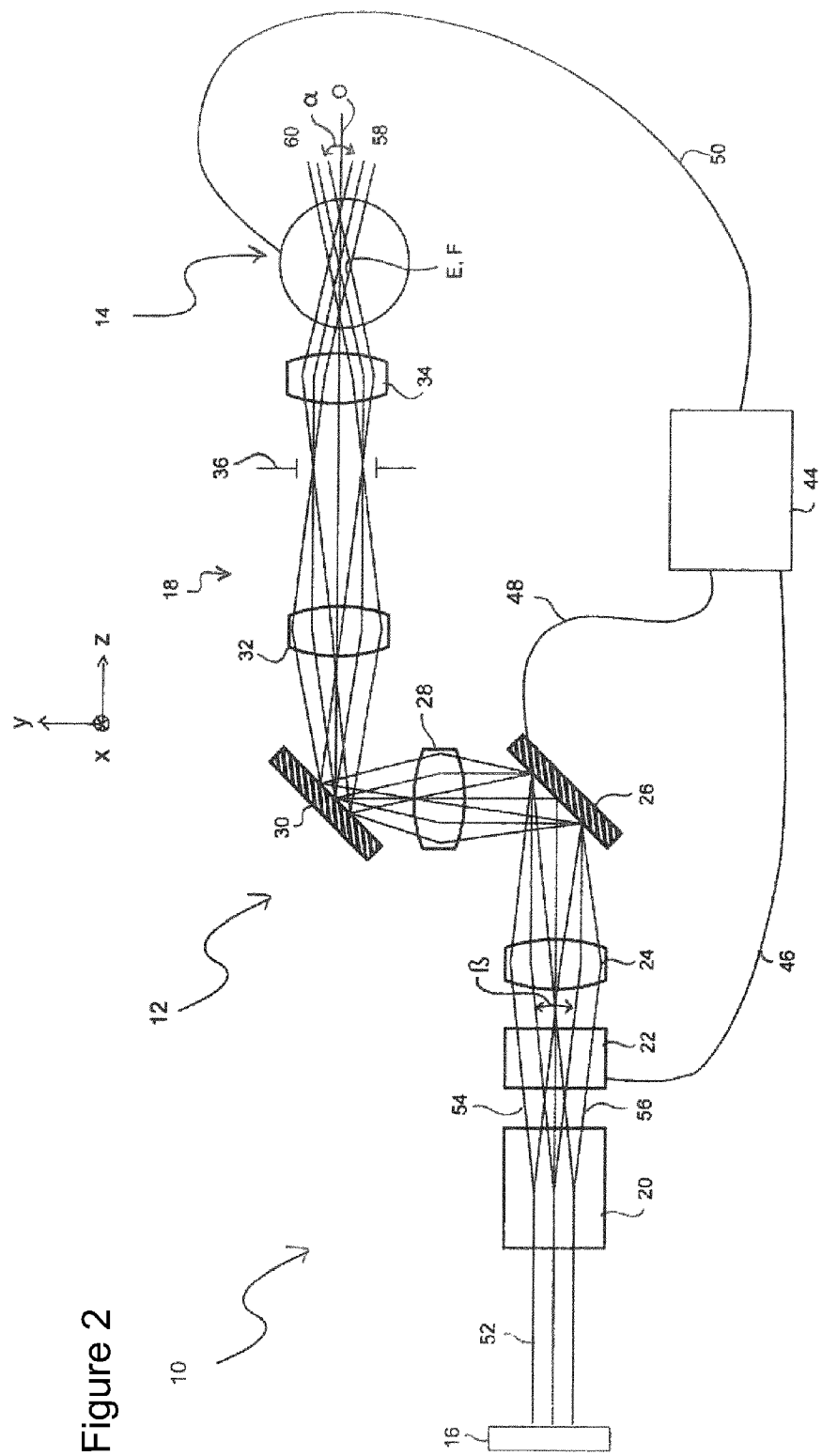
FIG. 2 shows a further schematic sectional view of the light-sheet microscope according to FIG. 1.

FIGS. 1 and 2 show sectional views of a light-sheet microscope 10.

The light-sheet microscope 10 comprises an illumination unit 12 and an imaging optical unit 14. The illumination unit 12 and the imaging optical unit 14 are aligned with respect to one another in the present exemplary embodiment such that their optical axes O or O', respectively, are perpendicular to one another in the region of a sample. Reference is made in each of FIGS. 1 and 2 to an orthogonal xyz coordinate system, the z-axis of which coincides with the optical axis O of the illumination unit 12. Accordingly, the light-sheet microscope 10 is shown in a x-z section in FIG. 1 and in a y-z section in FIG. 2. The illustrations according to FIGS. 1 and 2 are simplified and are solely schematic. Thus, only the components are shown which are required for the comprehension of the invention.

The illumination unit 12 has a light source 16 and an illumination optical unit denoted in general by 18 in FIGS. 1 and 2. The illumination optical unit 18 comprises a first polarization element in the form of a Wollaston prism 20, a motorized second polarization element in the form of a compensator 22, an anamorphic focusing system in the form of a cylinder lens 24, a motorized adjustment mirror 26, an ocular lens 28, a deflection mirror 30, a tube lens 32, and an illumination objective 34 having an objective pupil 36. The above-mentioned compensator is formed, for example, from a birefringent crystal, in particular a retarder plate.

The imaging optical unit 14 comprises an imaging objective 38 facing toward the sample to be imaged, a tube lens 40, and a location-resolving detector in the form of a camera 42.

The light-sheet microscope 10 furthermore contains a control unit 44, which controls the entire microscope operation. In particular, the control unit 44 is used in the present exemplary embodiment to control the compensator 22, the motorized adjustment mirror 26, and the camera 42 and also to perform the image evaluations explained below in detail. Accordingly, the control unit 44 is connected via control lines 46, 48, 50 to the compensator 22, the adjustment mirror 26, and the camera 42, respectively.

The light source 16 emits a collimated illumination light beam 52 onto the Wollaston prism 20, which consists, for example, of two right-angle prisms, for example, calcite prisms, which are cemented with one another on their base surfaces. The Wollaston prism 20 splits the incident illumination light beam 52 into two partial beams 54, 56, which have different polarization states, as shown in FIG. 2. The plane in which the Wollaston prism 20 splits the illumination light beam 52 into the two partial beams 54, 56 is parallel here to the y-axis, i.e., in the section according to FIG. 2 in the plane of the drawing and in the section according to FIG. 1 perpendicular to the plane of the drawing.

The two partial beams 54, 56 subsequently pass through the compensator 22, using which the polarization states of the partial beams 54, 56 may be influenced if needed. For this purpose, a positioning motor is provided in the light-sheet microscope 10, which acts under the control of the control unit 44 on the compensator 22 in such a way that it influences the polarization states of the two partial beams 54, 56 in the desired manner or leaves them unchanged.

The partial beams 54, 56 subsequently pass through the cylinder lens 24. The latter has the property that it only focuses each of the partial beams 54, 56 in a direction parallel to the x-axis, while it has no optical effect on the partial beams 54, 56 in a direction parallel to the y-axis. The cylinder lens 24 thus generates, in the region of its focal plane, a light sheet type illumination light distribution from each of the partial beams 54, 56, which is focused in the direction of the x-axis and extends flatly in the direction of the x-axis. It is to be noted in this context that the illustrations in this regard in FIGS. 1 and 2 are simplified for the sake of comprehensibility. Thus, for example, in FIG. 2 the foci of the two partial beams 54, 56 exiting from the cylinder lens 24, which corresponds to the planes conjugated with the cylinder lens 24, are arranged on the surface of the motorized adjustment mirror 26. However, one of these foci would actually be located in front of and the other behind this surface in the light propagation direction. This applies accordingly to the illustration of the foci on the surface of the deflection mirror 30. Moreover, the light deflections performed on the adjustment mirror 26 and the deflection mirror 30 are shown in the same manner in FIGS. 1 and 2, although these light deflections in the illustrated manner are given either only in the x-z plane or in the y-z plane.

After reflection on the adjustment mirror 26, the two partial beams 54, 56 pass through the ocular lens 28 and are reflected on the deflection mirror 30. Subsequently, after passage through the tube lens 32, the partial beams 54, 56 enter the entry pupil 36 of the illumination objective 34, which directs the partial beams 54, 56 onto the sample such that the partial beams 54, 56 illuminate the target region E of the sample from two different illumination directions.

The illumination optical unit 18 of the light-sheet microscope 10 generates, in the above-explained manner, two light sheets 58, 60 propagating in different illumination directions, which are superimposed on one another in a coplanar manner in the target region E to be illuminated of the sample. The two light sheets 58, 60 in the specific exemplary embodiment, under the assumption that the compensator 22 initially still leaves the polarization states of the partial beams 54, 56 uninfluenced, are linearly polarized orthogonally to one another in the target region E. Thus, for example, the light sheet associated with the partial beam 54 is p-polarized, while the light sheet associated with the partial beam 56 is s-polarized. The ocular lens 28, the tube lens 32, and the illumination objective 34 form an intermediate imaging optical unit within the illumination optical unit 18, which images the light sheets, which the cylinder lens 24 generates in the course of focusing the partial beams 54, 56 at the location of the deflection mirror 26, in the target region E of the sample.

In the exemplary embodiment according to FIG. 2, the two illumination directions from which the light sheets 58, 60 are oriented in the target region E of the sample enclose an angle α with one another. This angle α correlates with an angle ß, which the two partial beams 54, 56 enclose with one another after splitting by the Wollaston prism 22. Specifically, the angle α results according to the equation α=ß/γ, wherein γ denotes the magnification of the intermediate imaging optical unit formed from the ocular lens 28, the tube lens 32, and the illumination objective 34.

It is explained below with reference to the flow chart according to FIG. 3 on the basis of an exemplary embodiment how an overlap alignment can be performed using the light sheet 10, which is intended to bring the target region E of the sample illuminated using the two coplanar light sheets 58, 60 into spatial coincidence with a focal region F of the imaging optical unit 14, which is located according to FIG. 1 along the optical axis O' of the imaging optical unit 14 in the region of the focus of a detection beam bundle 62.

Figure 3:
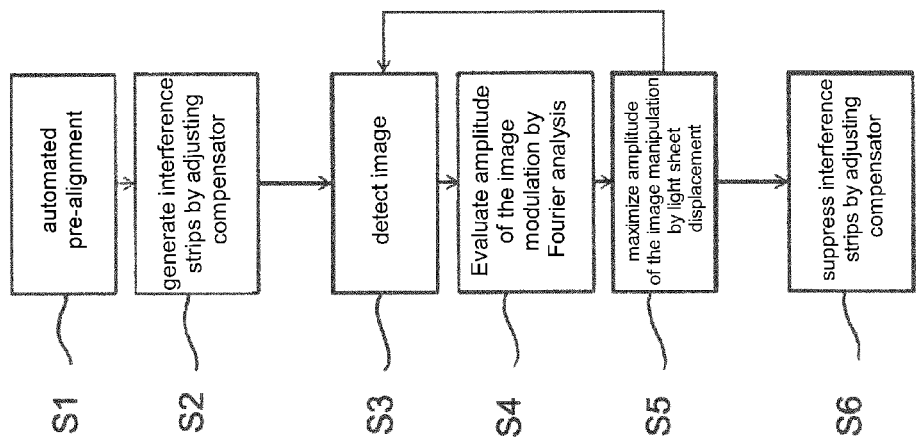
FIG. 3 shows a flow chart which illustrates the method for the overlap alignment according to the invention on the basis of an exemplary embodiment.

In step S1 of the flowchart according to FIG. 3, firstly an automated pre-alignment of the light sheet illumination on the focal region F of the imaging optical unit 14 takes place. The pre-alignment can be performed, for example, on the basis of the brightness of the image recorded by the camera 42. For this purpose, the adjustment mirror 26 is brought into a position, under the control of the control unit 44, in which the light sheet illumination ensures maximum image brightness.

Figure 5:
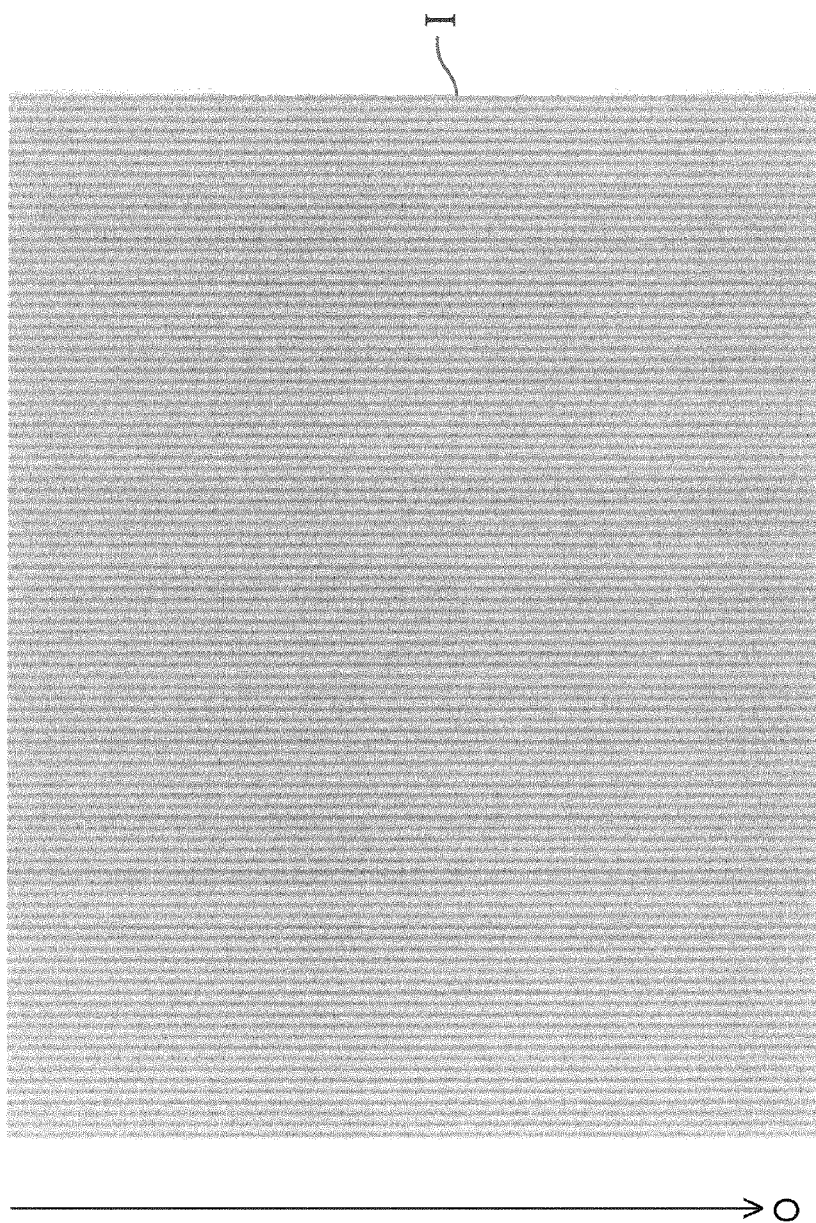
FIG. 5 shows an interference pattern generated in the target region.

After completed pre-alignment, in step S2, the polarization states of the two partial beams 54, 56 and thus of the two light sheets 58, 60 are set under the control of the control unit 44 by the compensator 22 such that a maximum interference of the two light sheets 58, 60 results in the target region E. In the present exemplary embodiment, the compensator 22 sets the polarization states of the two partial beams 54, 56 for this purpose in such a way that they are linearly polarized in parallel to one another. In this manner, an interference pattern is generated in the target region E by interference of the two light sheets 58, 60, as illustrated solely by way of example in FIG. 5. FIG. 5 shows an interference pattern I under the assumption of a completely homogeneous sample for the sake of simplicity.

The interference pattern I according to FIG. 5 has a plurality of interference strips, which extend with respect to FIG. 2 in a direction which runs in parallel to the bisector of the angle α. The angle α is enclosed by the two illumination directions in which the two light sheets 58, 60 propagate. In the example shown, the above-mentioned bisector of the angle α therefore coincides with the optical axis O of the illumination optical unit 18. The interference strips, as indicated in FIG. 5, thus extend in the direction of the optical axis O of the illumination optical unit 18.

Figure 7:
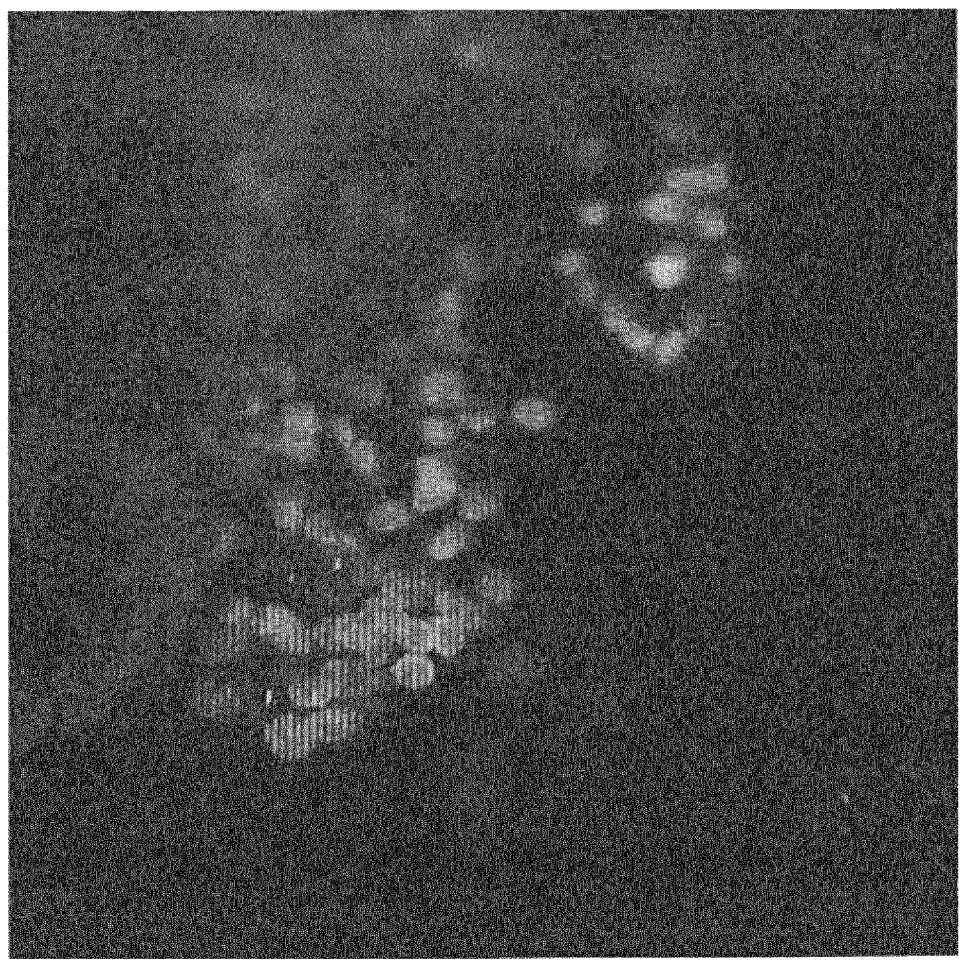
FIG. 7 shows an image of the target region which has an image modulation corresponding to the interference pattern for the purpose of overlap alignment.

The actual alignment takes place in following steps S3 to S5. Firstly, in step S3 an image of the target region E of the sample illuminated using the two light sheets 58, 60 is recorded by the camera 42. Since the two light sheets generate the interference pattern I shown in FIG. 5, an image modulation corresponding to the interference pattern is applied to the image recorded by the camera 42. This is illustrated in FIG. 7, which shows an image of the target region recorded by the camera 42, in which the image modulation corresponding to the interference pattern I is clearly apparent in the form of horizontal strips.

In step S4, the control unit 44 evaluates the image modulation contained in the recorded image. For this purpose, the control unit 44 uses the a priori knowledge of the characteristic of the interference pattern I as a result of the predetermined light sheet geometry. In the present exemplary embodiment, this characteristic is given by the modulation period, i.e., the distance between adjacent interference strips, and the alignment of the interference pattern according to FIG. 5. The modulation period results according to the following equation:

$$f = \lambda \sin(\alpha/2)$$

wherein f denotes the modulation period, λ denotes the wavelength of the light sheets, and a denotes the angle between the propagation directions of the two light sheets 58, 60. The alignment of the interference pattern also results directly from the predetermined light sheet geometry. As already mentioned above, in the present exemplary embodiment the interference strips run in parallel to the optical axis O of the illumination optical unit 18.

Figure 6:
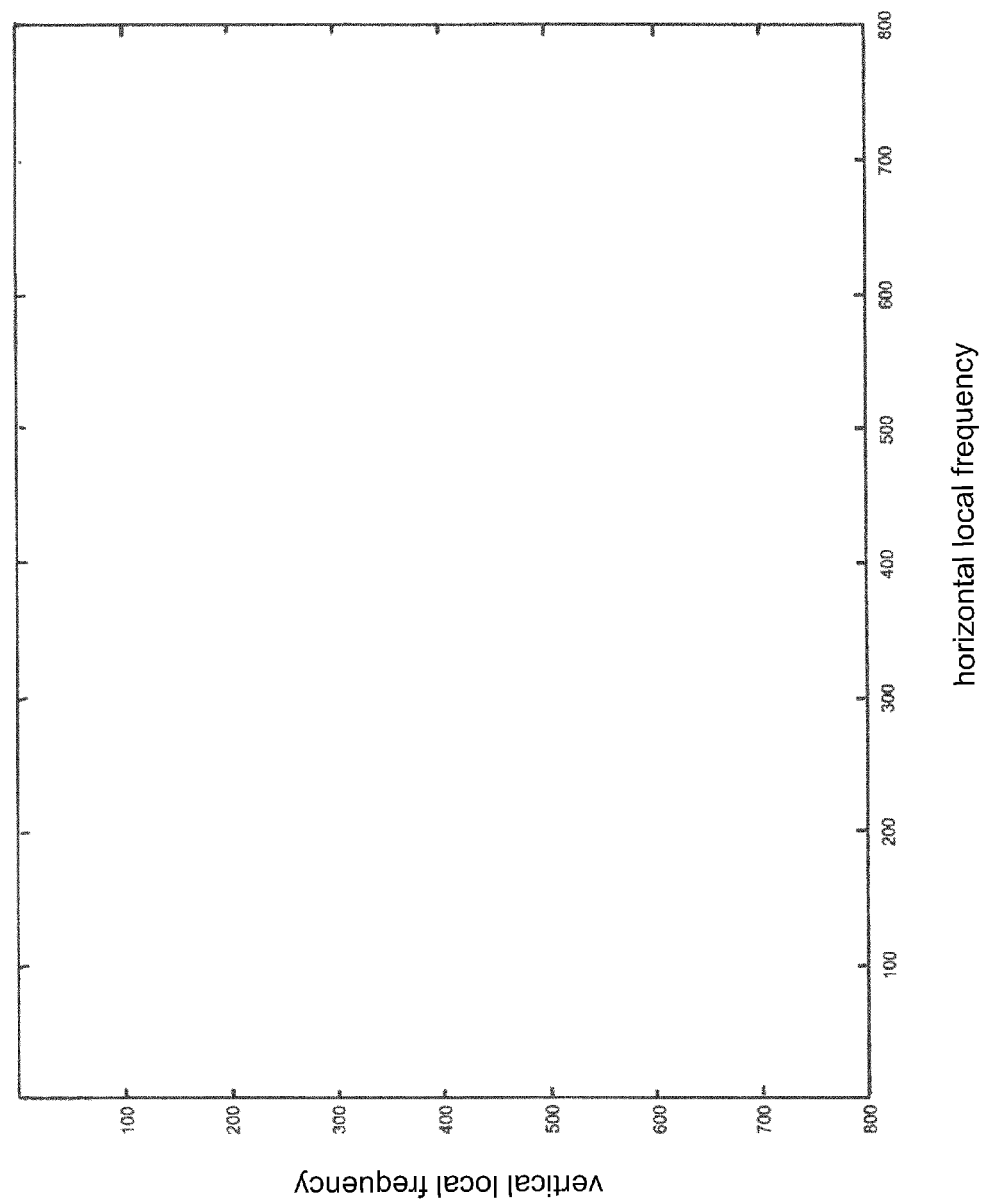
FIG. 6 shows the local spectrum of the interference pattern according to FIG. 5 generated by a Fourier transform.

The characteristic of the interference pattern according to FIG. 5 is reflected in its local spectrum generated by a Fourier analysis, which is shown in FIG. 6. In the diagram according to FIG. 6, the horizontal local frequencies are indicated along the horizontal axis and the vertical local frequencies are indicated along the vertical axis. The units are given by the properties of the discrete Fourier transform, and the signal intensity is shown as grayscale. The local spectrum according to FIG. 6 has two signals at local frequencies which result from the modulation period of the interference pattern shown in FIG. 5. More precisely, the local frequencies in FIG. 6 according to the Fourier transform each represent the reciprocal of the modulation period of the interference pattern I. For reasons of simpler illustration, the signal intensity at the local frequency zero, which represents the study component of the local spectrum, is omitted in FIG. 6, since it is multiple times greater than the signal intensity shown in FIG. 6. The steady component signal having the local frequency zero is between the two signals shown in FIG. 6 with respect to the horizontal axis. It is to be taken into consideration that the local frequencies in FIG. 6 are indicated in arbitrary units.

Figure 8:
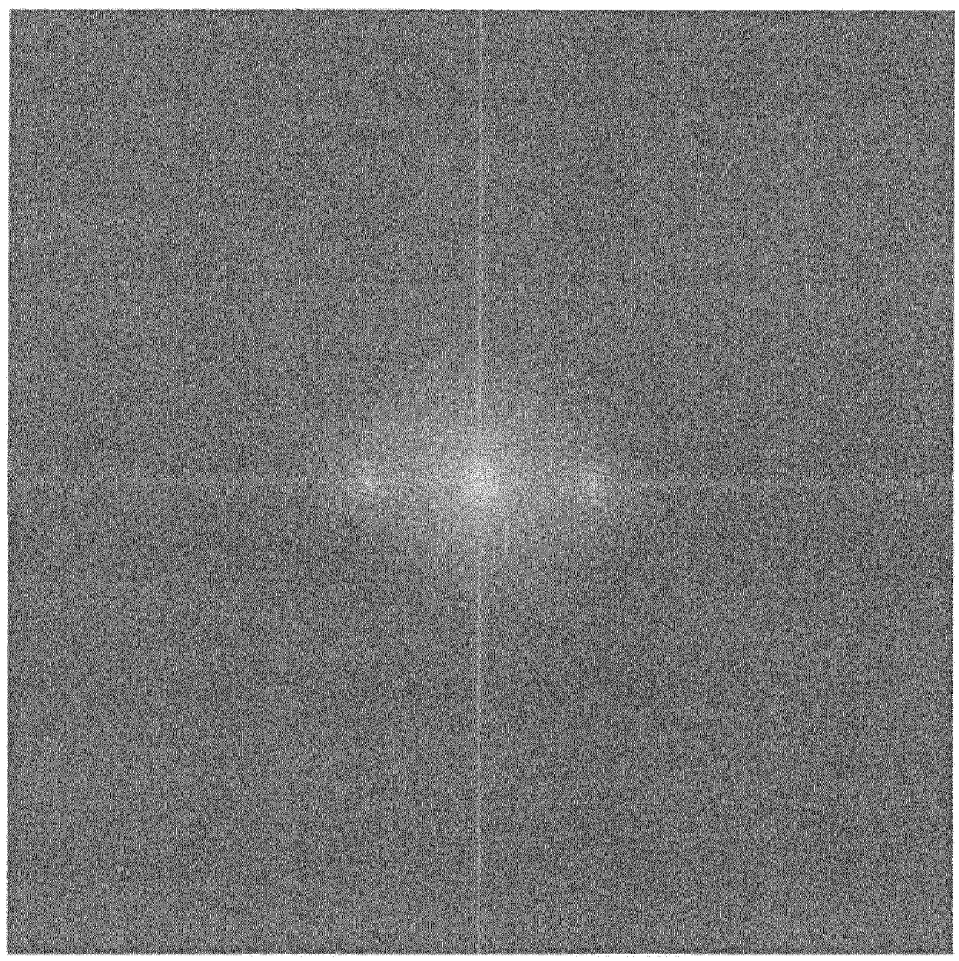
FIG. 8 shows a local spectrum of the image according to FIG. 7 obtained by a Fourier transform.

In step S4, the image shown in FIG. 7, which has the image modulation corresponding to the interference pattern I according to FIG. 5, is subjected to a Fourier transform and its local spectrum is thus generated, which is shown in FIG. 8. The local spectrum according to FIG. 8 shows two local frequency signals along the vertical axis, which are arranged at equal distances on both sides of a dominating central signal, which represents the steady component of the local spectrum at the local frequency zero. The two above-mentioned signals reflect the image modulation caused by the interference pattern I. In particular, the local frequency of these signals, i.e., the (positive) distance, which the signals have from the central steady component signal along the vertical axis, is defined by the modulation period of the interference pattern. The greater this local frequency is, the smaller is the modulation period of the interference pattern I, i.e., the smaller is the distance of adjacent interference strips in FIG. 7. The alignment of the two local frequency signals representing the image modulation in FIG. 8 corresponds to the direction of the image modulation in FIG. 7. It is thus apparent in FIG. 7 that the horizontally extending interference strips follow one another in the vertical direction.

It is known a priori on the basis of the characteristic of the interference pattern I predetermined by the light sheet geometry at which point, i.e., at which local frequency the local spectrum according to FIG. 8 is to be evaluated to quantitatively acquire the image modulation. In the present example, the local spectrum shown in FIG. 8 is to be evaluated in particular at the points of which the two signals are to be found above or below the central steady component signal (or only the upper signal having positive local frequency). This signal represents the amplitude of the image modulation and is therefore used hereinafter as an optimization parameter for the overlap alignment.

In step S5, the motorized adjustment mirror 110 is adjusted under the control of the control unit 44 by a predetermined positioning value, whereby the two superimposed light sheets 58, 60 are jointly displaced along the optical axis O' of the imaging optical unit 14. The control sequence subsequently returns to step S3.

Steps S3 to S5 are repeated, for example, with application of a linear, i.e., one-dimensional search algorithm (possibly using a suitable termination criterion) until the optimization parameter which is given by the location frequency signal detected in step S4, which represents the amplitude of the image modulation, is maximized.

Figure 4:
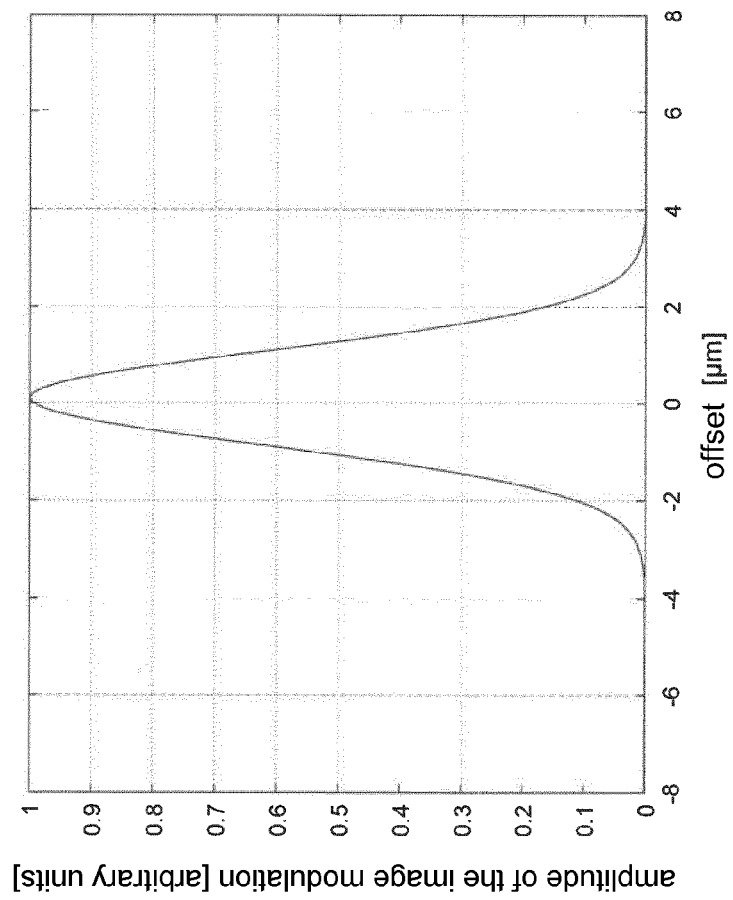
FIG. 4 shows a diagram which shows the amplitude of an image modulation in dependence on the offset between the illuminated target region and the focal region of the imaging optical unit of the light-sheet microscope.

FIG. 4 shows solely by way of example how the amplitude of the image modulation changes in dependence on an offset which occurs between the illuminated target region E and the focal region F of the imaging optical unit along its optical axis O'. If this offset is equal to zero, the amplitude of the image modulation is thus maximum and the overlap alignment is completed.

Figure 9:
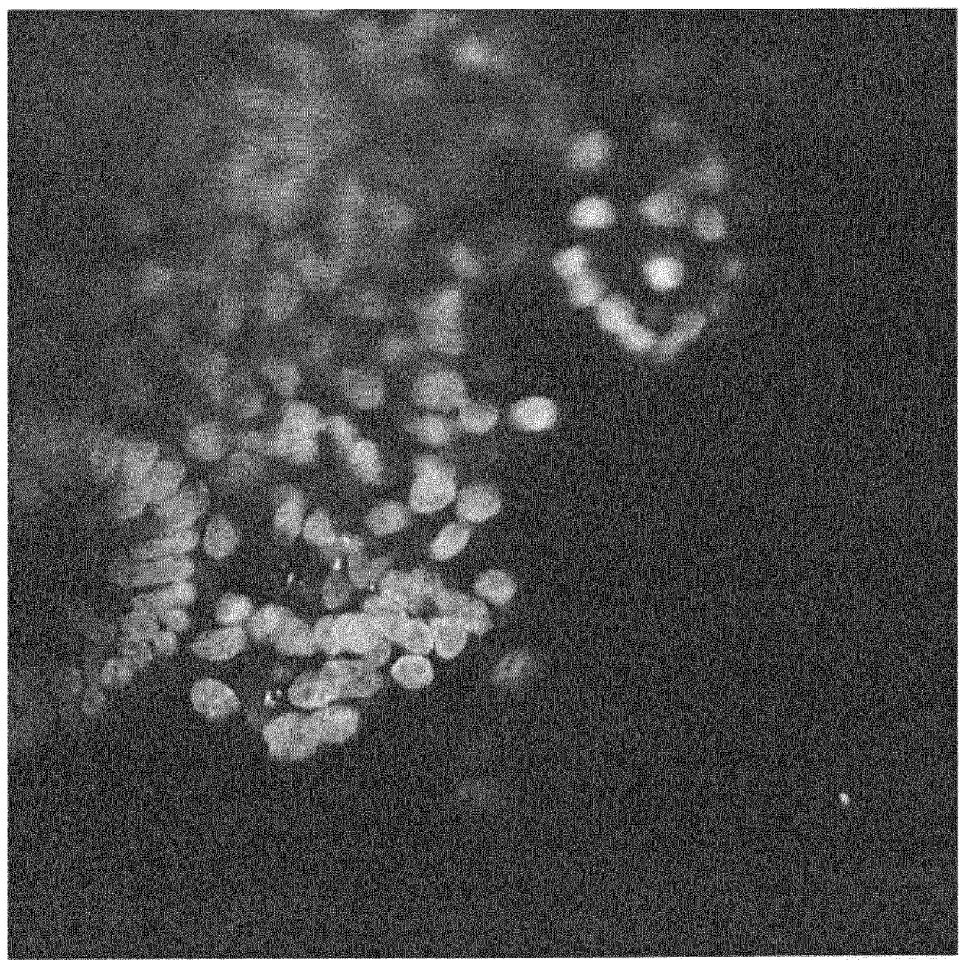
FIG. 9 shows the image of the target region after removal of the image modulation.

In step S6, the compensator 22 is finally controlled by the control unit 44 in such a way that it transfers the partial beams 54, 56 and thus the light sheets 58, 60 into polarization states in which the light sheets 58, 60 do not interfere with one another. In the present exemplary embodiment, the light sheets 58, 60 are linearly polarized orthogonally to one another in these polarization states. The interference pattern is caused to disappear in the target region E by this polarization setting. Accordingly, the image modulation is removed in the image of the target region E recorded by the camera 42, as shown in FIG. 9. The removal of the image modulation can also be carried out in such a way that the amplitude of the image modulation is used as an optimization parameter in a one-dimensional search method corresponding to steps S3 to S5, with the difference, of course, that the control unit 44 does not control the adjustment mirror 26 in this case, but rather the compensator 22 and the amplitude of the image modulation is not to be maximized but rather minimized. The image of the target region E freed of the image modulation in this way can be used for the actual imaging.

The invention is not restricted to the above-explained exemplary embodiment. It is thus possible, for example, to perform the overlap alignment in a way different from the described exemplary embodiment, in which the two light sheets 58, 60 are displaced along the optical axis O' of the imaging optical unit 14. It is thus also possible, for example, to displace the focal region F of the imaging optical unit 14 for the purpose of the overlap alignment. The polarization states of the light sheets 58, 60 can also be influenced in a different way than in the described exemplary embodiment, if it is ensured that the two light sheets 58, 60 interfere with one another in the target region E during the pre-alignment. In particular, it is possible that the compensator 22 acts on only one of the two partial beams 54, 56. The invention is also not restricted to directing the two light sheets 58, 60 from the same side onto the target region E as in the above-described exemplary embodiment. It is thus also possible, for example, to focus the two light sheets 58, 60 by means of suitable deflection elements from different sides in the target region. Such deflection elements can be implemented, for example, by so-called mirror caps, which are attached to the illumination objective 34 facing toward the sample.

The light microscope can also be embodied as an oblique plane microscope of the above-described type, which has a single objective facing toward the sample for the illumination and the detection While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 light-sheet microscope
12 illumination unit
14 imaging optical unit
16 light source
18 illumination optical unit
20 Wollaston prism
22 motorized compensator
24 cylinder lens
26 motorized adjustment mirror
28 ocular lens
30 deflection mirror
32 tube lens
34 illumination objective
36 objective pupil
38 imaging objective
40 tube lens
42 camera 44 control unit
46 control line
48 control line
50 control line
52 illumination light beam
54 partial beam
56 partial beam
58 light sheet
60 light sheet
62 detection beam bundle
O optical axis of the illumination unit
O' optical axis of the imaging optical unit
E target region
F focal region
α angle
ß angle
I interference pattern

The invention claimed is:

1. A method for imaging a sample using a light-sheet microscope, the method comprising:
illuminating the sample from two different illumination directions using two light sheets, which have different polarization states and are superimposed on one another in a coplanar manner in a target region of the sample;
generating an image of the illuminated target region using an imaging optical unit of the light-sheet microscope;
generating an interference pattern using the two light sheets in the illuminated target region, whereby an image modulation corresponding to the interference pattern is applied to the image of the target region;
evaluating the image modulation; and
aligning the illuminated target region in relation to a focal region of the imaging optical unit based on the evaluated image modulation, by displacing the two light sheets superimposed on one another in the coplanar manner jointly along an optical axis of the imaging optical unit.

2. The method as claimed in claim 1, wherein the image modulation is evaluated by determining its amplitude, and wherein the illuminated target region is aligned in relation to the focal region of the imaging optical unit in such a way that the amplitude is maximized.

3. The method as claimed in claim 1, wherein a characteristic of the interference pattern is predetermined and the image modulation is evaluated based on the predetermined characteristic.

4. The method as claimed in claim 1, wherein the interference pattern is generated in the form of a strip pattern having interference strips which run in parallel to a bisector of an angle which the illumination directions of the two light sheets enclose with one another, wherein the strip pattern has a modulation period according to the following equation:

$$f = \lambda \sin(\alpha/2)$$

wherein:
f denotes the modulation period,
λ denotes the wavelength of the light sheets, and
α denotes the mentioned angle.

5. The method as claimed in claim 1, wherein the image modulation is evaluated by subjecting the image to a Fourier analysis.

6. The method as claimed in claim 1, wherein the two light sheets are transferred into interference-capable polarization states before the alignment of the illuminated target region in relation to the focal region of the imaging optical unit.

7. The method as claimed in claim 6, wherein the two light sheets are linearly polarized non-orthogonally to one another before the alignment of the illuminated target region in relation to the focal region of the imaging optical unit.

8. The method as claimed in claim 6, wherein the two light sheets are brought into non-interference-capable polarization states after the alignment of the illuminated target region in relation to the focal region of the imaging optical unit.

9. The method as claimed in claim 1, further comprising providing a pre-alignment, in which the illuminated target region is adjusted as a function of brightness of the image in relation to the focal region of the imaging optical unit.

10. The method as claimed in claim 1, wherein the two light sheets are generated using an illumination optical unit, and wherein an optical axis of the illumination optical unit is substantially perpendicular to the optical axis of the imaging optical unit.

11. A light-sheet microscope, comprising:
an illumination unit configured to illuminate a sample from two different illumination directions using two light sheets, which have different polarization states and are superimposed on one another in a coplanar manner in a target region of the sample;
an imaging optical unit configured to generate an image of the illuminated target region; and
a control unit configured to:
control the illumination unit in such a way that an interference pattern is generated using the two light sheets in the illuminated target region, whereby an image modulation corresponding to the interference pattern is applied to the image of the target region,
evaluate the image modulation, and
control the illumination unit and/or the imaging optical unit in such a way that the illuminated target region is aligned in relation to a focal region of the imaging optical unit based on the evaluated image modulation, by displacing the two light sheets superimposed on one another in the coplanar manner jointly along an optical axis of the imaging optical unit.

12. The light-sheet microscope as claimed in claim 11, wherein the illumination unit comprises:
a light source configured to generate an illumination light beam;
a first polarization element configured to split the illumination light beam into two differently polarized partial beams; and
an illumination optical unit configured to generate the two light sheets illuminating the target region from the two partial beams.

13. The light-sheet microscope as claimed in claim 12, wherein an optical axis of the illumination optical unit is substantially perpendicular to the optical axis of the imaging optical unit.

14. The light-sheet microscope as claimed in claim 11, wherein the illumination unit comprises a deflection element controllable by the control unit, the deflection element configured to displace the two light sheets superimposed on one another in a coplanar manner are displaceable jointly along the optical axis of the imaging optical unit.

15. The light-sheet microscope as claimed in claim 11, wherein the illumination unit comprises a second polarization element controllable by the control unit and configured to transfer the two light sheets alternately into interference-capable polarization states and non-interference-capable polarization states.

16. The light-sheet microscope as claimed in claim 15, wherein the second polarization element is a retarder plate.

\* \* \* \* \*